United States Patent
Geupel

(10) Patent No.: US 10,764,057 B2
(45) Date of Patent: Sep. 1, 2020

(54) METHOD AND SYSTEM FOR AUTHENTICATING A TRUSTED USER INTERFACE

(71) Applicant: Rubean AG, Munich (DE)

(72) Inventor: Hermann Geupel, Munich (DE)

(73) Assignee: Rubean AG, Munich (DE)

( * ) Notice: Subject to any disclaimer, the term of this patent is extended or adjusted under 35 U.S.C. 154(b) by 247 days.

(21) Appl. No.: 16/006,143

(22) Filed: Jun. 12, 2018

(65) Prior Publication Data

US 2018/0359103 A1 Dec. 13, 2018

(30) Foreign Application Priority Data

Jun. 12, 2017 (DE) .......... 10 2017 112 854
Jun. 20, 2017 (DE) .......... 10 2017 113 529

(51) Int. Cl.
*H04L 9/32* (2006.01)
*G06F 9/445* (2018.01)
(Continued)

(52) U.S. Cl.
CPC ........ *H04L 9/3234* (2013.01); *G06F 9/44526* (2013.01); *G06F 21/42* (2013.01);
(Continued)

(58) Field of Classification Search
CPC ......... G06F 21/33–36; G06F 21/42–43; H04L 9/0825; H04L 9/14–16; H04L 9/30;
(Continued)

(56) References Cited

U.S. PATENT DOCUMENTS

2013/0111208 A1 5/2013 Sabin et al.
2013/0173915 A1* 7/2013 Haulund ............... H04L 9/3226
713/159
(Continued)

FOREIGN PATENT DOCUMENTS

EP 3246865 A1 11/2017

OTHER PUBLICATIONS

Kunz et al., "Mastercard customer can soon pay be selfie", via ApplePay and Selfie-Pay (http://www.welt.de/finanzen/verbraucher/-article152595657/Mastercard-Kunden-koennen-bald-per-Selfie-bezahlen.html); published Feb. 24, cited in specification, 2016; 2 pages.

(Continued)

*Primary Examiner* — Kevin Bechtel
(74) *Attorney, Agent, or Firm* — Hamre, Schumann, Mueller & Larson, P.C.

(57) ABSTRACT

A method for authenticating a trusted user interface of a first user terminal which incorporates a scan function, comprising the steps
a) installing an app that provides the trusted user interface which contains a private and public key pair of a first asymmetric cryptosystem and opening the app on the first user terminal,
b) opening a dedicated web page on a second user terminal and inputting a self-chosen certificate of authenticity in an open web session on the web page which likewise contains a private and public key pair of the first cryptosystem,
c) generating and displaying a graphic code on a display screen of the second user terminal via the web session of the dedicated web page,
d) scanning the graphic code displayed on the second user terminal into the app by means of the first user terminal,
(Continued)

e) identifying the web session of the dedicated web page with the app based on the graphic code and logging into same via the first user terminal,
f) mutually authenticating and establishing of an encrypted connection between the app and the web page by means of their key pairs,
g) transmitting the certificate of authenticity from the web session to the app on the first user terminal,
h) sustained displaying of the respective certificate of authenticity on the open trusted user interface on the first user terminal.

20 Claims, 1 Drawing Sheet

(51) Int. Cl.
  *G06F 21/42*   (2013.01)
  *H04L 9/08*   (2006.01)
  *H04L 9/14*   (2006.01)
  *H04L 9/30*   (2006.01)
  *G06F 8/61*   (2018.01)
  *G06K 7/14*   (2006.01)
  *G06K 7/10*   (2006.01)

(52) U.S. Cl.
  CPC .............. *H04L 9/0825* (2013.01); *H04L 9/14* (2013.01); *H04L 9/30* (2013.01); *H04L 9/3215* (2013.01); *H04L 9/3228* (2013.01); *H04L 9/3268* (2013.01); *H04L 9/3273* (2013.01); *G06F 8/61* (2013.01); *G06K 7/1417* (2013.01); *G06K 2007/10524* (2013.01)

(58) Field of Classification Search
  CPC ... H04L 9/3215; H04L 9/3228; H04L 9/3234; H04L 9/3263–3268; H04L 9/3273; H04L 63/08; H04L 63/0823; H04L 63/0853; H04L 63/0869
  See application file for complete search history.

(56) References Cited

U.S. PATENT DOCUMENTS

| | | | |
|---|---|---|---|
| 2014/0020070 A1 | 1/2014 | Angal | |
| 2015/0281231 A1* | 10/2015 | Ganesan | H04W 12/1008 |
| | | | 455/411 |
| 2018/0041339 A1* | 2/2018 | Lee | H04W 12/0608 |

OTHER PUBLICATIONS

German patent application DE10 2017 106 295.5 filed on Mar. 23, 2017, cited in specification; unpublished; 17 pages.

Search Report issued in counterpart European application No. 18176577.7; dated Aug. 28, 2018, 10 pages.

Li et al., "Survey of Cloud Messaging Push Notification Service", 2013 International Conference on Information Science and Cloud Computing Companion, Dec. 7, 2013, pp. 273-279; 10 pages.

Anonymous, "Trusted execution environment—Wikipedia", Oct. 3, 2014, 6 pages.

* cited by examiner

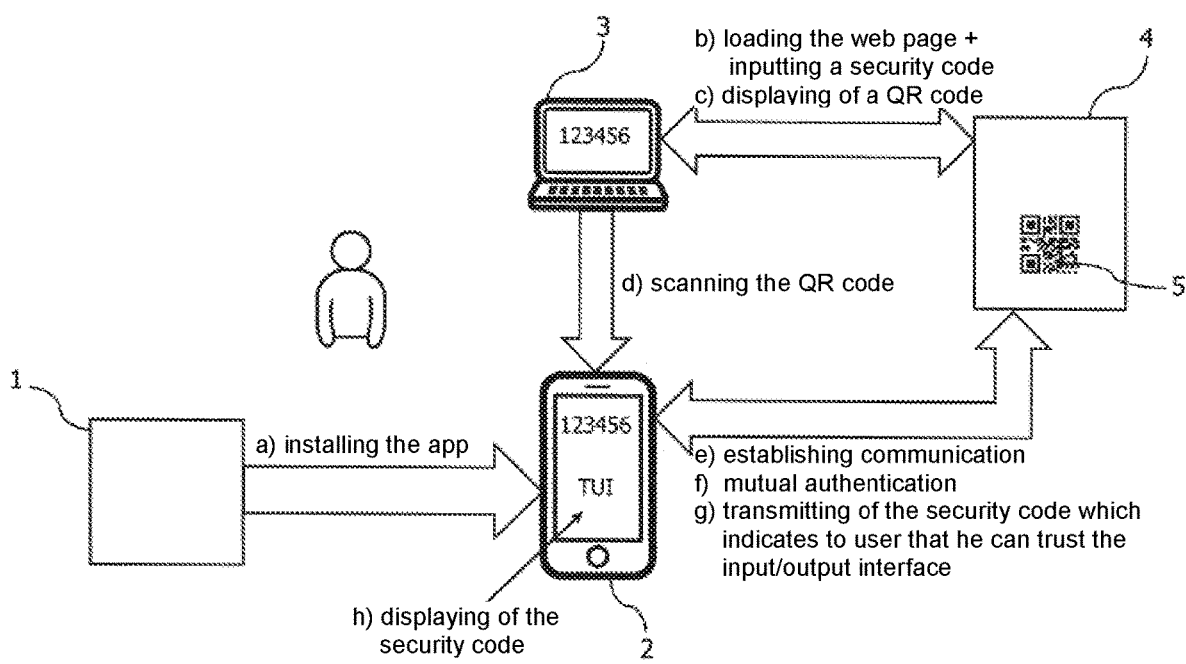

METHOD AND SYSTEM FOR AUTHENTICATING A TRUSTED USER INTERFACE

The invention relates to a method for authenticating a trusted user interface of a user terminal incorporating a scan function, in particular a smart phone, as well as a system for realizing said method. Such a method and system are in particular of interest in the context of online payments for goods and services.

Online shops today often offer multiple authentication methods from among which to choose in the context of authorizing an online payment:
- via prepayment, instant bank transfer or PIN/TAN-based online banking procedures in which the customer must have his online banking PIN ready and manage the TAN
- via ApplePay and Selfie-Pay (http://www.welt.de/finanzen/verbraucher/article152595657/Mastercard-Kunden-koennen-bald-per-Selfie-bezahlen.html) biometric processes which can lead to false rejections
- via Paypal, a not all that technically secure method which only verifies a password.

In unpublished European patent application no. 16204208.9, the applicant proposes a method and system of the aforementioned type which is simple for the user and yet highly secure which reliably functions with high-quality mobile devices.

A suitable smartphone is thereby accorded the function of a point-of-sale terminal for debit and credit cards capable of near-field communication (NFC). With respect to fulfilling the usual security requirements for payment procedures, the security features of the respective user terminal as implemented by the manufacturer are of importance.

In unpublished German patent application no. 102017106295.2, the applicant posed the task of identifying a further user-friendly and yet concurrently secure method and system for authorizing online payments which can be implemented in mid-range and lower-priced end devices and thus accessible to a wider audience.

The cited application solves the task posed in particular by the fact that the card PIN, which is required for a smartcard-compliant activation of the signature function on the debit or credit card (card), is not entered via a user interface of the user terminal (smartphone), which would require safeguards against PIN phishing, but rather sent automatically to the card via the user terminal by a server secured end-to-end (from the server to the card).

When used in online banking, the method described therein replaces the TAN (international: one-time code) with a signature on the card which to date has only been able to be activated via special, contact-based card readers (secoders) and not by commercially available smartphones.

Even with respect to this newer prior art, the problem still persists of ensuring that all method steps and system components integrate as far as possible the highest possible security against attempts to ferret out critical user data, particularly in view of even further refined and aggressive phishing attacks.

This task is solved by a method having the features of claim 1, 2 or 5 or respectively a system having the features of claim 13 or 14. Advantageous further developments of the inventive concept constitute the subject matter of the respective dependent claims.

The invention incorporates the idea of a one-time authentication of the trusted user interface used for online banking via interaction with a web page to be classified as trusted. It further incorporates the idea of thereby using a user-selected certificate of authenticity or security code which the user only uses once and thus does not need to remember or store anywhere and which at the same time serves as a "seal of authenticity" of his user interface. The cited user interface authentication in conjunction with the web page ensues by way of an asymmetric cryptosystem which preferentially at the same time serves in the encrypting of the certificate of authenticity during transmission between system components. Although the authentication thus includes an additional process, which is generally inconvenient for the user, it is kept within strict limits and would seem to be reasonable in view of the significant increase in method and system security.

The invention remedies a significant security vulnerability in methods and systems of the type outlined above and achieves the user being able to rely on the interface he uses without any worry, which strengthens the user's confidence in the cited methods and systems and thus substantially improves their marketability.

In preferential implementations of the method and system, the first user terminal is a smartphone and the app is a mobile app. In principle, however, the invention is also applicable to user terminals connected to data lines.

In further implementations of the method, the graphic code is a QR code and/or the self-chosen authenticity certificate is a multi-digit number and/or series of letters.

In a further implementation, the web session identification via which the certificate of authenticity is ultimately transmitted to the first user terminal is not displayed in a graphic code but is rather transmitted fully automatically and thus in more user-friendly manner by a notification service.

In a further implementation, said notification service is the Push Notification Service from Google® or Apple®.

In a further implementation, instead of the web session identification, a weblink is transmitted to the first user terminal via which the first user terminal ultimately obtains the certificate of authenticity.

In a further advantageous implementation, the app providing the trusted user interface comprises at least one first sub-app and one second sub-app installed in different areas of the first user terminal and which communicate with each other in encrypted manner. Particularly the encrypted communication between the first sub-app and the second sub-app thereby ensues using a symmetric cryptosystem.

In terms of system aspects, this implementation is in particular designed such that the first sub-app is installed in a trusted execution environment, TEE, and the second sub-app is installed in an embedded secure element, eSE, of the first user terminal. Specifically, the second sub-app conducts the communication with the trusted web page while the first sub-app realizes the display of the certificate of authenticity on the trusted user interface.

Advantages and functionalities of the invention in other respects are yielded by the following explanation of an example embodiment based on the lone FIGURE as well as a modification of same.

The FIGURE illustrates a system for authenticating a trusted user interface.

In step a), after the mobile app 1 to be checked for authenticity is installed on the user's smartphone 2, the user opens a trusted web page 4 serving in verifying the authenticity of the mobile app from a desktop PC 3. In step b), he then enters a security code of his own creation on the web page, which is depicted in the FIGURE as being "123456."

The two-dimensional graphic code 5 displayed on the web page 4 in step c), a QR code in the example, is then scanned by the user in step d) with the mobile app 1. The QR code 5 displays the web session currently connecting the PC 3 and web page 4 to the mobile app and enables the mobile app 1 to log into the same web session in step e).

In step f), the mobile app 1 and the web page 4 mutually authenticate each other. If the smart phone 2 preferably has a trusted execution environment (TEE); i.e. a separate operating system environment for fraud-proof input and output via the phone's screen, and an embedded secure element (eSE); i.e. an additional chip in the phone for security-critical computing processes, and the mobile app 1 uses both security environments and accordingly has a first sub-app installed in the TEE and a second sub-app installed in the eSE, the mobile app communicates with the trusted web page via its sub-app 2 and uses a private key in the second sub-app for the authentication.

In step g) following successful authentication, the web page 4 confidentially communicates the security code entered previously by the user to the second sub-app, preferably encrypted with the public key of the second sub-app used in the mutual authentication. The second sub-app confidentially passes the security code on to the first sub-app which then henceforth displays it in step h) as the certificate of authenticity on the trusted user interface (TUI).

In a slightly modified procedure, the security code could also be entered via the TUI and then displayed on the trusted web page in order to verify the authenticity of the TUI. The input of the security code would accordingly not be made on the web page in step b) but rather via the TUI of the mobile app following the QR code-based communication established between the web page and the mobile app between step f) and g). In a further step, the user would then have to check whether the same security code is displayed on the web page.

Furthermore, the invention can also be implemented in a plurality of modifications of the example depicted here and of the aspects of the invention emphasized further above.

The invention claimed is:

1. A method for authenticating a trusted user interface of a first user terminal which incorporates a scan function, comprising the steps
    a) installing an app that provides the trusted user interface which contains a private and public key pair of a first asymmetric cryptosystem and opening the app on the first user terminal,
    b) opening a dedicated web page on a second user terminal and inputting a self-chosen certificate of authenticity in an open web session on the web page which likewise contains a private and public key pair of the first cryptosystem,
    c) generating and displaying a graphic code on a display screen of the second user terminal via the web session of the dedicated web page,
    d) scanning the graphic code displayed on the second user terminal into the app by means of the first user terminal,
    e) identifying the web session of the dedicated web page with the app based on the graphic code and logging into same via the first user terminal,
    f) mutually authenticating and establishing of an encrypted connection between the app and the web page by means of their key pairs,
    g) transmitting the certificate of authenticity from the web session to the app on the first user terminal,
    h) sustained displaying of the respective certificate of authenticity on the open trusted user interface on the first user terminal.

2. A method for authenticating a trusted user interface of a first user terminal which incorporates a scan function, comprising the steps
    a) installing an app that provides the trusted user interface which contains a private and public key pair of a first asymmetric cryptosystem and opening the app on the first user terminal,
    b') opening a dedicated web page on a second user terminal which likewise contains a private and public key pair of the first cryptosystem,
    c) generating and displaying a graphic code on a display screen of the second user terminal via the web session of the dedicated web page,
    d) scanning the graphic code displayed on the second user terminal into the app by means of the first user terminal,
    e) identifying the web session of the dedicated web page with the app based on the graphic code and logging into same via the first user terminal,
    f) mutually authenticating of the app and the web page and establishing of an encrypted connection between them by means of their private and public key,
    g1') inputting a self-chosen certificate of authenticity via the open user interface on the first user terminal,
    g2') transmitting the first user terminal authenticity certificate from the app to the web page in the web session,
    g3') user verifying of the second user terminal in the web session displaying the self-chosen certificate of authenticity,
    g4') confirming successful verification via a confirmation input on the first user terminal,
    h) sustained displaying of the respective certificate of authenticity on the open trusted user interface on the first user terminal.

3. The method according to claim 1, wherein the first user terminal is a smartphone and the app is a mobile app.

4. The method according to claim 1, wherein the graphic code is a QR code.

5. A method for authenticating a trusted user interface of a first user terminal which incorporates a scan function, comprising the steps
    a) installing an app that provides the trusted user interface which contains a private and public key pair of a first asymmetric cryptosystem and opening the app on the first user terminal,
    b) opening a dedicated web page on a second user terminal and inputting a self-chosen certificate of authenticity in an open web session on the web page which likewise contains a private and public key pair of the first cryptosystem,
    c') transmitting of the identification of the open web session from the web server of the open web page to a notification service with which the first user terminal has already previously registered,
    d') forwarding the identification of the open web session from the notification service to the first user terminal,
    e') identifying the web session of the dedicated web page with the app based on the transmitted identification and logging into the web session via the first user terminal,
    f) mutually authenticating and establishing of an encrypted connection between the app and the web page by means of their key pairs,
    g) transmitting the certificate of authenticity from the web session to the app on the first user terminal,
    h) sustained displaying of the respective certificate of authenticity on the open trusted user interface on the first user terminal.

6. The method according to claim 5, wherein the notification service is a so-called Push Notification Service from Google® or Apple®.

7. The method according to claim 5, wherein instead of the identification of the open web page, a weblink is sent to the first user terminal via which the first user terminal ultimately obtains the certificate of authenticity.

8. The method according to claim 1, wherein the self-chosen authenticity certificate is a multi-digit number and/or series of letters.

9. The method according to claim 1, wherein the self-chosen authenticity certificate is transmitted from the web page to the app encrypted with the public key of the app or from the app to the web page encrypted with the public key of the web page respectively.

10. The method according to claim 1, wherein the app providing the trusted user interface comprises at least one first sub-app and one second sub-app installed in different areas of the first user terminal and which communicate with each other in encrypted manner.

11. The method according to claim 10, wherein the encrypted communication between the first sub-app and the second sub-app is based on asymmetric key pairs of a second asymmetric cryptosystem in each sub-app.

12. The method according to claim 9, wherein the first sub-app is installed in a trusted execution environment, TEE, and the second sub-app is installed in an embedded secure element, eSE, of the first user terminal, and the communication in the web session is realized by the second sub-app and the display of the certificate of authenticity on the trusted user interface is realized by the first sub-app.

13. A system for authenticating a trusted user interface of a first user terminal which incorporates a scan function, comprising:
the first user terminal,
an app installed on the first user terminal which implements the trusted user interface incorporating the scan function on the first user terminal and contains a private and public key pair of a first asymmetric cryptosystem,
a second user terminal,
a dedicated web page for realizing the authenticating which likewise contains an asymmetric key pair and is designed to communicate with the app and to generate a graphic code and display it on the second user terminal,
the system configured to:
input a self-chosen certificate of authenticity in an open web session on the dedicated web page which likewise contains a private and public key pair of the first asymmetric cryptosystem;
generate and display a graphic code on a display screen of the second user terminal via the open web session of the dedicated web page;
scan the graphic code displayed on the second user terminal into the app by means of the first user terminal;
identify the open web session of the dedicated web page with the app based on the graphic code and logging into same via the first user terminal; mutually authenticate and establish an encrypted connection between the app and the dedicated web page by means of their key pairs;
transmit the certificate of authenticity from the open web session to the app on the first user terminal; and
sustain display of the certificate of authenticity on the trusted user interface on the first user terminal.

14. A system for authenticating a trusted user interface of a first user terminal, comprising:
the first user terminal,
an app installed on the first user terminal which implements the trusted user interface on the first user terminal and contains a private and public key pair of a first asymmetric cryptosystem,
a second user terminal,
a notification service with which the first user terminal has registered,
a dedicated web page for realizing the authenticating which likewise contains an asymmetric key pair and is designed to communicate with the app and to send a web session identification via the notification service to the first user terminal,
the system configured to:
input, via the second user terminal, a self-chosen certificate of authenticity in an open web session on the dedicated web page which likewise contains a private and public key pair of the first asymmetric cryptosystem; identify the web session of the dedicated web page with the app via the notification service and the first user terminal;
mutually authenticate and establish an encrypted connection between the app and the dedicated web page by means of their key pairs;
transmit the certificate of authenticity from the web session to the app on the first user terminal; and
sustain display of the certificate of authenticity on the trusted user interface on the first user terminal.

15. The system according to claim 13, wherein the first user terminal is a smartphone and the app is a mobile app.

16. The system according to claim 13, wherein the app providing the trusted user interface comprises at least one first sub-app and one second sub-app installed in different areas of the first user terminal and which communicate with each other in encrypted manner.

17. The system according to claim 16, wherein the first and second sub-app contains the components of a second asymmetric cryptosystem.

18. The system according to claim 16, wherein the first sub-app is installed in a trusted execution environment, TEE, and the second sub-app is installed in an embedded secure element, eSE, of the first user terminal, and the second sub-app serves in the web session communication and the first sub-app serves in displaying the certificate of authenticity on the trusted user interface.

19. The system according to claim 14, wherein the first user terminal is a smartphone and the app is a mobile app.

20. The system according to claim 14, wherein the app providing the trusted user interface comprises at least one first sub-app and one second sub-app installed in different areas of the first user terminal and which communicate with each other in encrypted manner.

* * * * *